L. T. JOHNSON.
SCALE.
APPLICATION FILED FEB. 19, 1916.
1,369,815.
Patented Mar. 1, 1921.
2 SHEETS—SHEET 1.
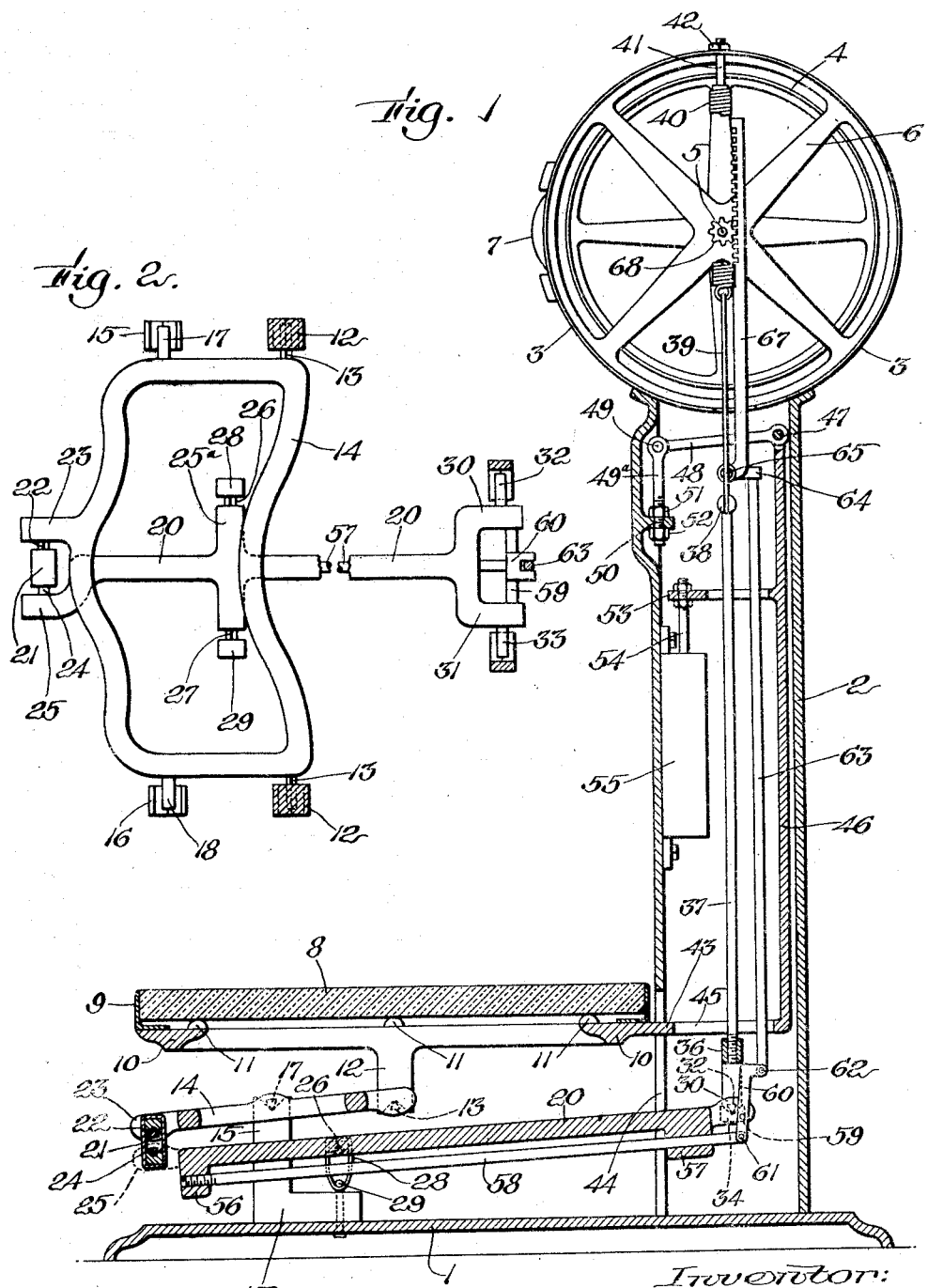
Inventor:
Leonard T. Johnson,
by Geo. H. Maxwell
Attorney

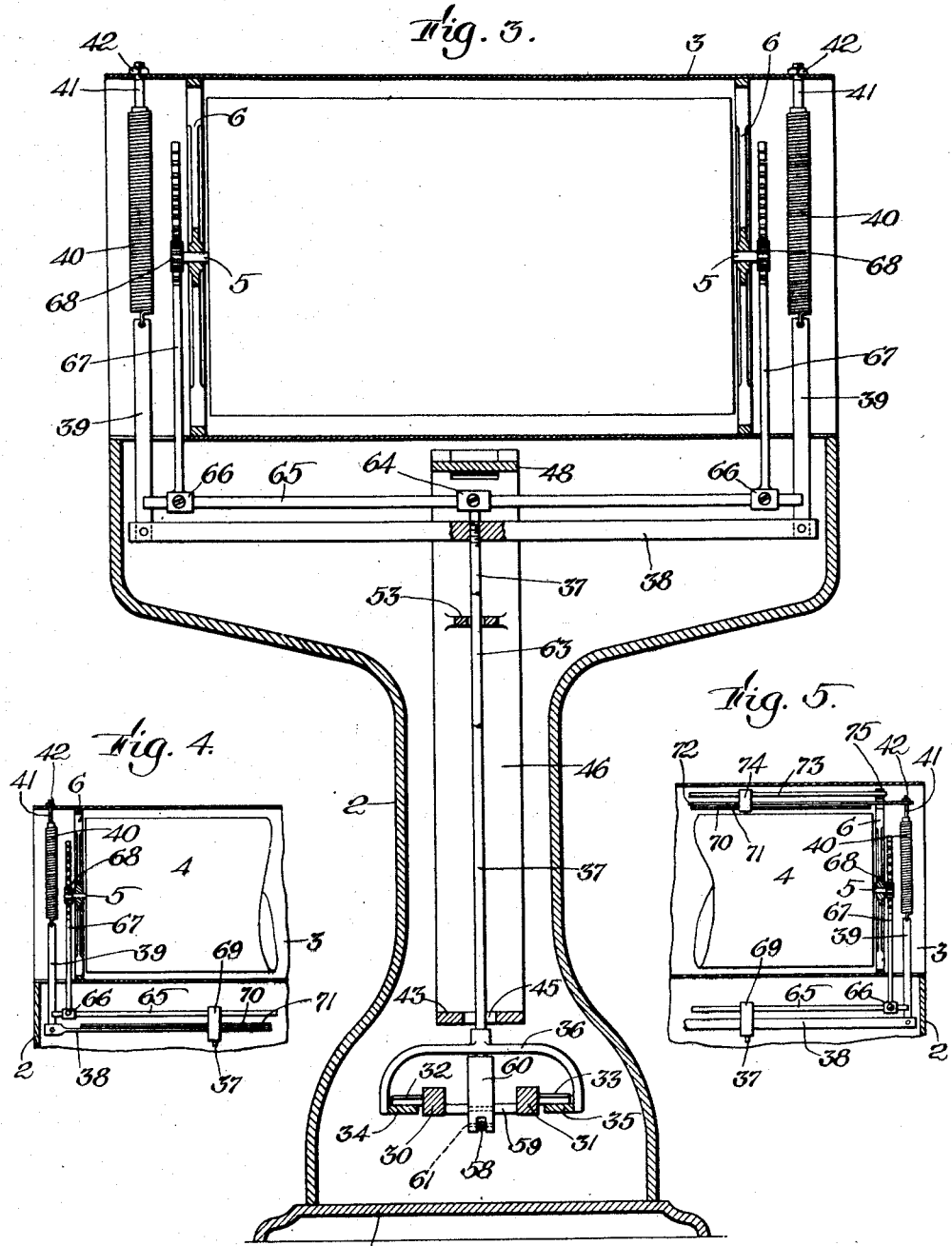

UNITED STATES PATENT OFFICE.

LEONARD T. JOHNSON, OF BOSTON, MASSACHUSETTS.

SCALE.

1,369,815. Specification of Letters Patent. Patented Mar. 1, 1921.

Application filed February 19, 1916. Serial No. 79,314.

*To all whom it may concern:*

Be it known that I, LEONARD T. JOHNSON, a citizen of the United States, and resident of Boston, in the county of Suffolk and State of Massachusetts, have invented an Improvement in Scales, of which the following description, in connection with the accompanying drawings, is a specification, like letters on the drawings representing like parts.

My present invention relates to automatic scales of the platform type, and the object of the invention is to improve, simplify, and perfect such scales, and preferably computing and price-indicating scales. In carrying out my invention, I am enabled to utilize the simplest form of leverage principle, known in the weighing scale art as the No. 1 lever. Furthermore, I am enabled to make a platform scale without the use of any counterpoise or complex construction, greatly simplifying the entire scale mechanism and insuring quick, accurate, and sensitive working. I accomplish these objects by my novel construction of an evening bar or double lever, which automatically compensates for differences due to the changing leverage, caused by swinging of the main beam or weight-carrying lever, giving an ease, flexibility, and entire absence of any binding action to the weighing mechanism.

I have also devised a novel arrangement of thermostat to automatically compensate for temperature changes on the weighing springs, preferably arranging such thermostat directly on the evening bar, and thereby obtaining the automatic compensating features of said bar, and connecting the thermostat only with the chart or price-indicating mechanism, instead of both with the spring and chart. In other words, it is only necessary to vary the actuating devices of the price chart to compensate for temperature changes in the weighing springs, thus allowing of light, simple mechanism to be controlled by the thermostat instead of arranging a heavy thermostatic device capable of withstanding strain between the springs and load. This feature is an important advantage, and I preferably use a simple thermostat formed of a single substance utilizing the lengthening or shortening of the same to control the actuation of the price chart.

Other features of the invention, novel details of construction, and important advantages will be hereinafter more fully pointed out and claimed.

Referring to the drawings illustrating a preferred embodiment of my improved scale, Figure 1 is a side view, partly in cross section;

Fig. 2 is a plan view of the weighing levers;

Fig. 3 is a front view, partly in cross section of the scale;

Figs. 4 and 5 are cross sectional views, on a reduced scale, showing a modification of thermostat construction applied to the springs and price chart of the scale and operated by single direct connection with my novel form of evening bar.

In the drawings I have illustrated a platform automatic computing scale, embodying my invention. Upon a base 1 is the vertical hollow support or standard 2, extended laterally at its upper portion to hold the cylinder 3. This cylinder contains the price chart or drum 4 mounted in axles 5, 5, in side frames or arbors 6, 6 held within the cylinder 3, as clearly shown in the drawings. The cylinder 3 has a sight opening 7 to permit a view of the figures contained upon the price chart or drum 4. Rotation of this drum in connection with the movement of the weighing mechanism, when a weight or load is being weighed, indicates the price, in well-known manner.

The weighing platform 8 which is preferably of glass held within a flanged rim 9 on the supporting frame 10, rests upon bosses 11, 11, 11 carried on the supporting frame 10, said frame having two central depending lugs or side portions 12, 12, constituting bearings resting upon bearing pins 13, 13 carried at opposite sides of the main lever 14 (see Figs. 1 and 2). This main lever is supported upon pedestals 15 and 16 secured to the scale 1, bearing pins 17 and 18 extending from the main lever 14 and resting in the bearings at the top of the pedestals 15 and 16 respectively. I arrange the pedestal supports 15 and 16 for the main lever 14 forwardly of the platform bearings, and arrange my second lever, or evening bar 20, in a plane parallel with that of the main lever 14 and connected therewith at the outer end by a link 21, fitting over the upper bearing pin 22 held in a projecting lug 23 on the main lever 14 and the lower bearing pin 24 carried in a similarly projecting lug 25 on the evening bar 20. The pivotal bearings 15—17 and 16—18 for the main lever 14 are on a line equidistant between the platform bearings 12—13 and the bearing of the link 21. The evening bar 20 is connected to the weighing springs of the scale at the opposite end to that of the link connection and has an intermediate flexible fulcrum, consisting in a cross-bar 25ª carrying bearing pins 26 and 27 at its opposite ends bearing upwardly against stirrup blocks 28 and 29 respectively, each of said blocks being pivotally connected to the platform 1, preferably through staples 29 (see Fig. 1). The forward end of the evening bar 20 is forked, having arms 30 and 31, on which bearing pins 32 and 33 respectively are carried. These pins rest upon coöperating bearing blocks 34 and 35 held in a fork 36 connected to the rod 37 extending vertically through the hollow standard 2, and with its upper end flexibly connected onto the crossbar 38, said crossbar in turn having its ends pivotally united to links 39, 39 attached to the weighing springs 40, 40 supported in the top of the cylinder 3 by bolts 41, 41 and nuts 42, 42. I prefer to make the connections at opposite ends of the rods 37 as right and left-handed screws, so that rotating the rod 37 will secure an initial adjustment of the springs on the lever 20. Further adjustment can be obtained by tightening or loosening the nuts 42 on the bolts 41 of the weighing springs. By the construction thus described, it will be appreciated that the depression of the weighing platform 8 acting through the main lever 14 on the link 21 and the second or evening bar 20, will rock the latter on its fulcrum, depressing the forked arms 30 and 31 and pulling downwardly upon the rod 37, bar 38, links 39, and springs 40 until equilibrium is reached through the tension of the springs 40. The levers 14 and 20 are preferably in substantial parallelism, and it will be appreciated that by having the second lever 20 so arranged as to rock in parallelism with the main lever 14, that it is, in effect, the combination of two direct weighing levers on the simplest leverage principle, the second lever 20 acting as an evening bar in automatically compensating for the rocking of the first lever, transmitting such rocking movement directly to the weighing springs. By arranging the pivots of the lever 14 midway between the platform bearing on one end and the link bearing 21 on the other, and also arranging the fulcrum or pivots of the evening bar 20 to secure any desired percentage or ratio, for example midway between the platform bearing and the fulcrum on the main lever 14, giving a 2 to 1 ratio as illustrated. I provide a construction which insures flexibility in the movement of both levers and entire freedom from any binding, furthermore eliminating the necessity of a counterpoise which has heretofore been customary in platform scales. In the particular form of two-point support for the platform 8, illustrated in the drawings, it is necessary to have a device to hold the platform horizontal during the working of the scale. To this end I extend rearwardly from the frame 10 a portion 43 into the rear of the standard 2, passing through a slot 44 formed in said standard to permit entrance therein of the evening bar 20. Said extending portion 43 also being slotted at 45 to permit the weighing rod 37 to pass therethrough, and with the upwardly extending part 46. To the upper end of 46 is pivoted at 47, one end of a link 48, said link having its other end pivoted at 49 to an eye bolt 49ª passing through a socket in a boss 50 formed at the front of the standard 2. This bolt 49ª is adjustable vertically, having threaded thereon, above and below the bracket 50, nuts 51 and 52. The link 48, between its pivot points 47 and 49, is approximately equal to the distance on the main lever 14 between its central fulcrum and the platform support, and the bolt 49ª is adjusted until the bar 48 is substantially parallel with said lever 14. This construction permits the platform 8 to be held horizontally during the vertical movement imparted thereto in the operation of the scale, the entire platform and portions 43 and 46 moving vertically in unison, the lengthening and shortening of the bar 48 being identical with the same movement of the lever 14 during such vertical reciprocation. I may apply a dashpot, if deemed desirable, conveniently attaching same by a bracket 53 extending from 46 and being connected with the piston rod 54 attached to a piston (not shown) within the dashpot 55, such a dashpot connection being of well-known form. While I have illustrated the invention in connection with a two-point support for the platform, it will be obvious that a four-point scale support could be substituted if desired.

To take care, automatically, of temperature changes in the weighing mechanism, I provide a novel form of thermostat and preferably connect said thermostat only with the chart actuating devices, as illustrated in Figs. 1 and 2, although it is equally feasible to utilize a connection with the thermostat to both the spring and chart mechanisms,—for example, as shown in the modified form of Figs. 4 and 5. As the action of the evening bar 20 with the main lever 14 automatically takes care of a counterbalancing and weighing movement imparted to said lever, I prefer to apply my thermostat directly to the evening bar. To this end the evening bar 20 is formed with depending lugs 56 and 57. The lug 56 at its forward end being threaded to receive the correspondingly threaded end of the thermostat 58, and the lug 57 being bored to permit the thermostat 58 to extend freely therethrough. I prefer to make said thermostat of a single metallic substance, such, for example, as brass, zinc, or ebonoid, to which temperature changes will impart a different movement than that given to the bar 20, which is, for example, of iron. In cold weather the springs, being of steel, tend to shorten and stiffen, and therefore not only raise the scale bars out of adjustment, but also cause the scale to weigh inaccurately, and in warm weather the tendency is to lengthen and loosen correspondingly. The thermostat 58 is arranged to offset this effect of hot and cold temperature by the different lengthening and shortening of the thermostat bar 58 and its connections. At the forked end of the evening bar 20 is mounted on a pivot 59, a short lever 60, having its lower end pivoted at 61 to the free end of the thermostatic rod 58, so that variations in the temperature effects on the evening bar 20 and rod 58 will tend to rock the lever 60 on its pivot, the forward end of the rod 58 being rigidly united with the forward end of the bar 20. I prefer to form the lever 60 as a bell crank with its upper end pivoted at 62 to the rod 63 extending vertically within the standard 2, and having its upper end threaded into a block 64, said block being bored to receive the horizontal bar 65. This bar has, on each end, a sliding block 66; in each block the end of a rack bar 67 is threaded, which rack bars extend upwardly and mesh with pinions 68, 68 on the outer ends of the axles 5, 5, supporting the price chart and drum 4. Oscillation of the lever 60 and vertical movement of the rod 63 therefore produce changed actuation of the price chart relatively with the weighing mechanism, such change being dependent upon the variations of the bar 20 and the thermostat 58 with the temperature. The various threaded adjustments, both of the thermostat in the lug 57 and the rod 63 in the block 64, permit of quick and ready assembling to secure appropriate working of the thermostat mechanism.

In Figs. 4 and 5 I have illustrated the modifications of thermostatic connection which may be advantageously utilized in my improved automatic scale, without affixing the thermostat to the evening bar. In Fig. 4, both the springs 40 and price chart drum 4 are actuated together through vertical movement of the rod 37 attached to the evening bar 20. Said rod is connected to a block 69, which block has a recess for the horizontal rod 65 actuating the rack bars 67 to turn the price chart, and a recess of appropriate size to receive both the horizontal rod 38 connected with the links 39 and springs 40 and a thermostat comprising members 70 and 71. This thermostat acts as a brace or support for the rod 38 which bears loosely upon the portion 71 of the thermostat. Said thermostat comprising the different metallic substances 70 and 71, is made to yield or strain under varying temperatures and thus to compensate for the shortening or lengthening of the springs 40 respectively, during said temperature variations. In the form illustrated in Fig. 5, the thermostat 70 and 71 carries the bar 72 which supports the springs 40 on opposite ends, yielding of the thermostat 70 and 71 compensating for temperature variations in the springs 40 through the yielding or straightening of the supporting bar 72. A block 74 carried by a rod 73 fitted at each end in holes 75 in the arbors 6, constitute the spring supporting structure for this form. The temper of the crossbar 38 in Fig. 4, and 72 in Fig. 5, may be such as to readily permit yielding. In both these modifications as well as in the preferred form illustrated in Figs. 1 and 3, I apply the thermostat connections to either the price chart actuating mechanism or the weighing mechanism, it being only necessary to correct one of such actuating mechanisms to take care of temperature changes.

The operation of the scale will be readily understood from the foregoing description of the drawings, and the advantages of my improved scale construction will be appreciated by those skilled in the art. The provision of my normal form of double weighing levers, consisting in a main lever and an evening lever or bar substantially in parallelism therewith, enable an extremely simple, sensitive scale to be economically made, eliminating the complex constructions heretofore necessary through counterpoise, heavy connections, and the like. I believe that this provision of double levers, each constituting a No. 1 principle of leverage, and one lever constituting an automatically compensating or evening bar for the scale mechanism, is a distinct novelty, and I wish to claim the same broadly. I also believe that the provision of a thermostat acting upon either the price chart indicating mechanism or the weighing mechanism, is novel. And also the arrangement of the thermostat, which is itself a lever, is an important novel feature, and I wish to claim the same broadly. Furthermore the novel combination of the dashpot secured directly to the apparatus which maintains the platform on a two-point support level during its weighing movement is important and simplifies the construction. The arrangement of a flexible fulcrum on a weighing bar, herein shown as the flexible fulcrum on the second lever or finished bar of my scale, is a specially advantageous feature and I believe that I am entitled to claim the same broadly.

Having described my invention, what I claim as new and desire to secure by Letters Patent is:

1. A scale of the kind described, a platform to receive articles to be weighed, springs to balance the same independently of a counterpoise, and a price-computing chart, two substantially parallel levers, each fulcrumed forwardly of the platform and having a flexible link connection, and substantially parallel during oscillation at least one of said levers extending rearwardly and both levers being interposed between the platform and said springs and chart, and a flexible fulcrum for the rearwardly extending lever.

2. A platform scale of the kind described, having weighing springs and a price-indicating chart, a main weighing lever, operable on the No. 1 principle and actuated by said platform, a second lever arranged substantially parallel with said main lever, and a link connection thereto, a floating fulcrum for said second lever whereby both levers will be substantially in parallelism during oscillation and connections utilizing both levers between the platform and said springs and chart.

3. A platform scale of the class described, comprising a weighing lever, a platform to receive goods mounted on one end of said lever, a fulcrum for said lever forwardly of the platform support, a second lever controlling the main lever movement and extending rearwardly, a price chart, weighing springs, and connections from the rear end of the second lever to said chart and springs, comprising means to maintain said price chart at zero by shifting said connections vertically, and to maintain the weighing springs at normal capacity by shifting said connections horizontally.

4. A platform scale of the class described, having a vertically reciprocating platform, means to hold said platform in a horizontal plane during its movements, and weighing mechanism therefor, comprising a main lever supporting said platform at one end, a fulcrum for said lever midway of its ends, and connections at the free lever end with a second lever fulcrumed between the pivotal support for the first-mentioned lever and the platform support on one end, whereby the second lever becomes an automatic evening bar in the weighing mechanism and said springs balance the platform with its weight independently of a counterpoise.

5. A platform scale of the kind described having weighing springs, means to maintain the platform horizontal during its vertical reciprocations in the weighing operations, and a lever interposed between the weighing springs and the platform, said lever being mounted upon a swinging fulcrum permitting shifting of the fulcrum during the vertical reciprocations of said platform.

6. A platform scale of the kind described, having weighing springs and a price-indicating chart, a main weighing lever, a secondary lever flexibly connected thereto and movable substantially parallel therewith, a swinging fulcrum for said second lever, a bellcrank link connection carried by said second lever, and automatic means to swing said link outwardly and inwardly to compensate for temperature changes.

7. A platform scale of the kind described, having weighing springs and a price-indicating chart, a main weighing lever, a secondary lever flexibly connected thereto and substantially parallel therewith, a swinging fulcrum for said second lever, a bellcrank link connection carried by said second lever and joined to the chart, and automatic means to swing said link upwardly and downwardly to compensate for temperature changes.

8. A platform scale of the kind described, having weighing springs and a price-indicating chart, a main weighing lever, a secondary lever flexibly connected thereto, and movable substantially parallel therewith, a swinging fulcrum for said second lever, a bellcrank link connection carried by said second lever and joined to said chart, and automatic means to swing said link and simultaneously move the spring and chart connections to compensate for temperature changes by a movement horizontally and vertically.

9. A platform scale of the class described, comprising a weighing lever, a platform to receive goods mounted on said lever, a fulcrum for said lever forwardly of the platform support, a second lever controlling the main lever movement and flexibly connected therewith, a price chart, weighing springs and connections from one of said levers to said chart and spring, together with means automatically actuated to maintain said price chart at zero by shifting said connections vertically, and to maintain the weighing springs at normal capacity by shifting said connections horizontally.

In testimony whereof I have signed my name to this specification in the presence of two subscribing witnesses.

LEONARD T. JOHNSON.

Witnesses:
JAMES R. HODDER,
HAROLD J. CLARK.